M. G. A. MONSON.
BRAKE FOR CARRIERS.
APPLICATION FILED NOV. 18, 1919.
1,335,594.
Patented Mar. 30, 1920.
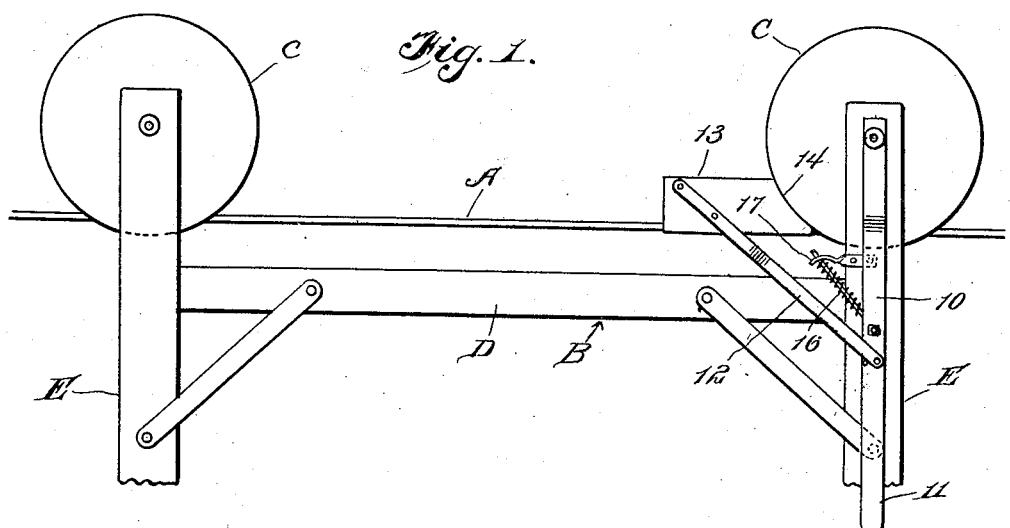
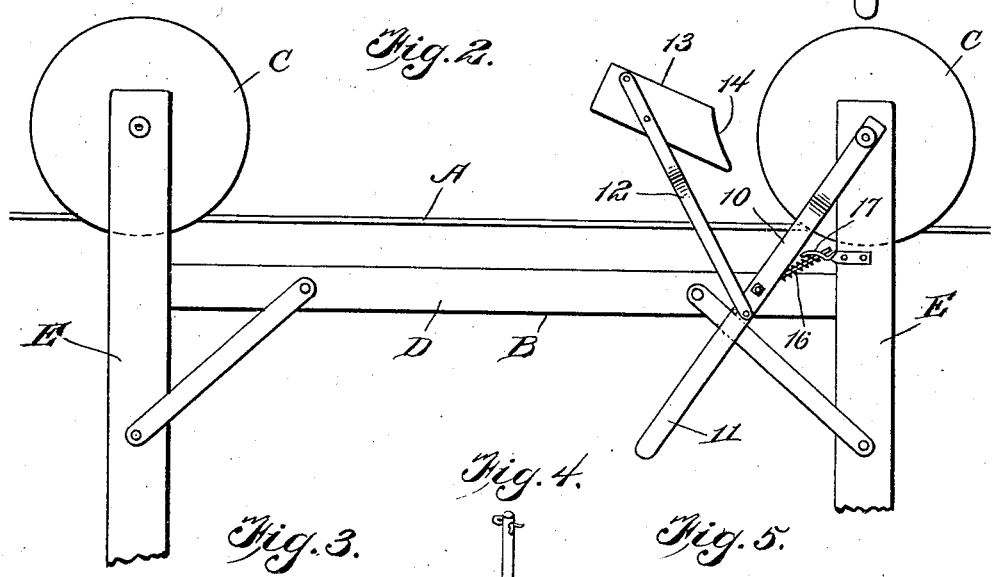
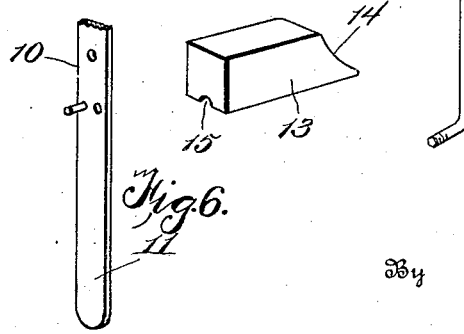
Inventor
M. G. A. Monson
By Victor J. Evans
Attorney

UNITED STATES PATENT OFFICE.

MARTIN G. A. MONSON, OF REDTOP, MINNESOTA.

BRAKE FOR CARRIERS.

1,335,594.  Specification of Letters Patent.  Patented Mar. 30, 1920.

Application filed November 18, 1919. Serial No. 338,994.

*To all whom it may concern:*

Be it known that I, MARTIN G. A. MONSON, a citizen of the United States, residing at Redtop, in the county of Aitken and State of Minnesota, have invented new and useful Improvements in Brakes for Carriers, of which the following is a specification.

This invention relates to carriers of the type used in transporting hay, ensilage, and other materials to or from a barn, the carrier being mounted upon a cable, and the object of the invention is the provision of a brake mechanism including a brake block engageable with the cable and also with one of the carrier wheels whereby to hold the carrier against movement upon the cable, the device being particularly advantageous owing to the fact that the inevitable slack in the cable makes it difficult to retain the carriage at either end of the cable.

An important object is the provision of a brake mechanism of this character which will be extremely simple and inexpensive in manufacture and installation, easy to operate, highly efficient and durable in use, and a general improvement in the art.

With the above and other objects and advantages in view, the invention consists in the details of construction to be hereinafter more fully described and claimed, and illustrated in the accompanying drawing in which—

Figure 1 is a side elevation of a cable supported carrier showing my invention thereon with the brake in set position.

Fig. 2 is a similar view showing the brake released, and

Figs. 3, 4, 5 and 6 are detail views.

Referring more particularly to the drawing, the letter A designates a cable upon which is mounted the carrier B which includes wheels C traveling upon the cable. This carrier of course includes a horizontal frame bar D and standards E at the ends thereof in which the wheels C are journaled.

In carrying out my invention I provide a lever 10 which is disposed at the side of one of the standards E and which is pivotally mounted at one end upon the axle of one of the wheels C. The other end of this lever is formed to provide a handle 11. Rigidly secured to the lever 10 intermediate its ends, is a bar 12 upon the free end of which is rigidly secured a brake block 13 having one end formed arcuate, as shown at 14, for conforming engagement with the adjacent wheel C and having its bottom edge provided with a longitudinal groove 15 for conforming engagement upon the cable A.

In order that the brake may be held in the desired position, I provide a spring 16 which is secured at one end to the lever 10 adjacent its connection with the bar 12 and which is connected at its other end with a bracket 17 secured upon the adjacent standard E.

In the operation of the brake, it will be seen that when the parts are in the position shown in Fig. 2, the brake block 13 will be spaced from the wheel and also the cable so that the carriage will be entirely free to move along the cable. When the parts are in this position the spring 16 will operate to retain them thus, the arrangement of the spring being such that in either position it comes beyond center. When it is desired to hold the carriage stationary, it is merely necessary that the operator grasp the handle portion 11 of the lever and swing the lever downwardly into vertical position, which action will result in bringing the block 13 into engagement with the adjacent wheel and the cable which will result in effectually braking the carriage. In this position the spring 16 will operate to hold the block in braking position so that danger of accidental movement of the parts will be prevented.

From the foregoing description and a study of the drawings it will be apparent that I have thus provided a simply constructed and easily installed brake mechanism which will remain at the desired position and which will efficiently perform all the functions for which it is intended.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. In combination with a carriage provided with wheels movable upon a cable, brake mechanism comprising a mechanism pivoted at one end upon the journal of one of the wheels and having its other end formed as a handle, a bar secured to said lever and extending therefrom at an angle, a brake block carried by said bar and formed at one end with an arcuate face for conforming engagement with the periphery of the adjacent wheel and having its underside adapted for engagement with said cable, a bracket secured at one end of the carriage, a rod pivotally connected with said lever and slidable through said bracket, and a spring surrounding said rod and abutting against the lever and said bracket whereby the spring will hold the lever in selected position with said block in or out of braking position.

2. In combination with a carriage provided with wheels and slidable upon a cable, brake mechanism comprising a lever pivoted at one end upon the journal of one of the wheels and having its other end formed as a handle, a bar secured to said lever at an angle with respect thereto, a brake block carried by the free end of said bar and formed at one end for conforming engagement with the periphery of the adjacent wheel and provided at its under side with a groove conformingly engageable with said cable, and a spring connected with said lever and with the carrier whereby to hold the lever in either selected position.

In testimony whereof I affix my signature.

MARTIN G. A. MONSON.